United States Patent
Cameron

(10) Patent No.: US 7,114,760 B2
(45) Date of Patent: Oct. 3, 2006

(54) SAFETY SHIELD WINDOW INSERT

(76) Inventor: Allan Cameron, 1 Edson Rd., South Natick, MA (US) 01760

( * ) Notice: Subject to any disclaimer, the term of this patent is extended or adjusted under 35 U.S.C. 154(b) by 46 days.

(21) Appl. No.: 10/973,625

(22) Filed: Oct. 26, 2004

(65) Prior Publication Data

US 2005/0050812 A1  Mar. 10, 2005

Related U.S. Application Data

(63) Continuation-in-part of application No. 09/499,550, filed on Feb. 7, 2000, now abandoned.

(60) Provisional application No. 60/119,096, filed on Feb. 8, 1999.

(51) Int. Cl.
  *F41H 5/13* (2006.01)
  *B60J 1/10* (2006.01)

(52) U.S. Cl. ............... 296/152; 49/57; 49/61; 49/62; 49/463; 109/49.5; 89/36.01

(58) Field of Classification Search ........... 296/152; 49/50, 57, 61, 463, 62
See application file for complete search history.

(56) References Cited

U.S. PATENT DOCUMENTS

| | | | |
|---|---|---|---|
| 2,917,111 A * | 12/1959 | Clarke | 160/91 |
| 3,855,898 A | 12/1974 | McDonald | 89/36.08 |
| 3,923,339 A | 12/1975 | McDonald | 296/95.1 |
| 4,068,428 A | 1/1978 | Peterson, III | 52/202 |
| 4,454,691 A | 6/1984 | Mitchell | 52/202 |
| 5,242,207 A | 9/1993 | Carson et al. | 296/146.15 |
| 5,271,311 A | 12/1993 | Madden | 89/36.08 |
| 5,413,026 A * | 5/1995 | Madden, Jr. | 89/36.08 |
| 5,533,778 A | 7/1996 | Sheridan | 296/152 |
| 5,570,542 A | 11/1996 | Cameron | 49/463 |
| 5,594,193 A | 1/1997 | Sheridan | 89/36.08 |
| 5,768,826 A | 6/1998 | Wilcher et al. | 49/61 |
| 5,811,719 A | 9/1998 | Madden | 89/36.08 |
| 5,857,730 A | 1/1999 | Korpi et al. | 296/146.1 |
| 6,012,257 A | 1/2000 | Caplette | 352/202 |
| 6,047,500 A | 4/2000 | Caplette | 49/466 |
| 6,280,826 B1 * | 8/2001 | Woll et al. | 428/192 |
| 6,604,776 B1 | 8/2003 | Edwards | 296/152 |
| 6,630,235 B1 | 10/2003 | Oshima et al. | 428/339 |
| 2002/0017802 A1 * | 2/2002 | Edwards | 296/136 |
| 2005/0050812 A1 | 3/2005 | Cameron | 52/204.1 |

* cited by examiner

*Primary Examiner*—Robert Canfield
(74) *Attorney, Agent, or Firm*—Grossman, Tucker, Perreault & Pfleger, PLLC

(57) ABSTRACT

A safety device for a motor vehicle having a door window defined by a retractable transparent panel which is guided into a receiving frame, the safety apparatus comprising a window insert formed of a sheet of material; a window frame including a transparent panel, the window frame having inside and outside surfaces; a lower mounting bracket for receiving the sheet, with an edge defined to be releasably inserted in the frame; an upper mounting bracket for receiving the sheet, the upper mounting bracket attached to the inside surface of the window frame.

12 Claims, 7 Drawing Sheets

SAFETY SHIELD WINDOW INSERT

CROSS-REFERENCE TO RELATED APPLICATIONS

This application is a continuation-in-part of U.S. patent application Ser. No. 09/499,550 filed Feb. 7, 2000, now abandoned and claims benefit of U.S. Provisional Application Ser. No. 60/119,096 filed Feb. 8, 1999.

FIELD OF THE INVENTION

The present invention relates to a safety device for a motor vehicle. More particularly, the present invention relates to providing a safety device comprising a window insert formed of an optically transmissive sheet of material mountable to the window door using lower and upper mounting brackets.

BACKGROUND

There has been increasing concern about violence, car jacking, and generally, the threat of firearms against people in motor vehicles. Vehicular occupants are particularly vulnerable to bodily injury or attack as a result of the relative ease of access to the occupant of a vehicle via the window of the door. Windows may easily be broken and provide little, if any, resistance to assault with a gun. This device provides a solution for the long felt need of an easy-to-use, low cost form of protection against these assaults.

Currently, an alternative for increasing the safety of a vehicle occupant is to have the motor vehicle bulletproofed by a professional service. This is reportedly an extremely expensive method requiring extensive modifications to the vehicle and costing tens of thousands of dollars. There are currently many materials and ways of achieving a bulletproof vehicle in the non-glass areas. However, the glass areas have few options for bulletproofing, principally, thick glass and glass/plastic laminates. Generally, these options are currently installed in two methods. One method is by splitting the vehicle's door and adding space to accommodate the thicker glass plus increasing the capacity of the electric motors required to raise and lower the heavier glass. This method is extremely expensive. The other method is laminating the extra thickness to the vehicle's window and not modifying the door. This leaves the vehicle's window in a permanently closed position. These options may be out of the financial range of the common person. Even law enforcement, which desperately needs protection, cannot reportedly afford the modifications.

In an aspect of the present invention, there are few, if any, devices available to restrain a child or family pet, such as a dog or cat, from exiting through an open window, other than a cage or container. For the safety and comfort of the child or pet, it is clearly beneficial to allow a constant flow of fresh air into the vehicle. Currently, the only choice for parents, or pet owners, who wish to bring safety and comfort to their children and/or pets; not confining them physically, or have concern about the amount of air flow, is to limit how far down the window is retracted; thus preventing the child or pet from exiting the window.

Automobile manufacturers are increasingly incorporating safety features into the design of automobiles, however, with respect to the windows on the automobile, the industry standard remains to simply use a window retracting into the door frame, sometimes limiting the distance of retraction. One safety feature that has been incorporated has been the use of a locking device activated by the driver that can be used to prevent passenger windows from being opened.

Cameron (U.S. Pat. No. 5,570,542) discloses a window insert that replaces, and is retained by, the vehicle's window. The window insert is fitted into the upper channel of the window frame and is retained in its place by the original window fitting into a groove running along the bottom of the insert. The window insert, because it is retained by the vehicle's window, is of limited use. The window cannot be rolled up when the insert is in place. Therefore, the driver is compelled to stop and remove the insert during inclement weather, or when it is desirable to reduce the flow of air through the insert. The bulletproof aspect of the window is more difficult to use as the insert needs extensive and complicated weather proofing to be used in any inclement weather.

Another system is discussed by Carson (U.S. Pat. No. 5,242,207). Carson discusses a vandal protective plastic sheet that requires four mounting brackets to be fastened with screws to the vehicle's window frame. This approach reportedly makes quick installation or removal impossible. However, these disclosures are unable to address the very difficult problem of year-round use in all types of weather and ease-of-use and installation. Accordingly, it would be essential for year round use to have an alternative window insert that allows the car's windows to be rolled up and down while the insert remains in place.

It is an object of the present invention to allow the car's windows to be rolled up and down while the insert remains in place.

It is another object of the present invention to allow installation or removal of the device in a short period of time.

It is a further object of the present invention to provide an affordable alternative as it can be instantly used on different vehicles of the same model.

It is a further object of the present invention to utilize the relationship of the motor vehicle window to its weather stripping to provide insert support and retain the vehicle's original window weatherproofing.

SUMMARY

A safety device for a motor vehicle having a door window defined by a retractable transparent panel which is guided into a receiving frame, the safety apparatus comprising a window insert formed of a sheet of material; a window frame including a transparent panel, the window frame having inside and outside surfaces; a lower mounting bracket for receiving the sheet, with an edge defined to be releasably inserted in the frame; an upper mounting bracket for receiving the sheet, the upper mounting bracket attached to the inside surface of the window frame.

BRIEF DESCRIPTION OF THE DRAWINGS

Features and advantages of the present invention are set forth herein by description of embodiments consistent with the present invention, which description should be considered in conjunction with the accompanying drawings, wherein.

DETAILED DESCRIPTION OF THE PREFERRED EMBODIMENTS

The present invention relates to a safety device for a motor vehicle. More particularly, the present invention relates to providing a safety device comprising a window insert formed of an optically transmissive sheet of material mountable to the window door using lower and upper mounting brackets.

In an embodiment of the present invention the window insert is formed from a high impact resistant transparent material. More preferably, the window insert can be easily installed into the window frame. Most preferably, the high impact material forming the window insert is a "bullet proof" material, such as a glass composite, glass-plastic composite or all plastic. It should also be appreciated that the thickness of the material can vary according to the level of protection desired.

In another embodiment of the present invention the window insert includes a plurality of openings allowing venting of air for the benefit vehicle occupants, yet having the openings proportioned to prevent a child or pet from exiting the vehicle via the window. More preferably, the material forming the window insert is preferably a plastic, such as a polycarbonate, or acrylic material.

In another embodiment of the present invention the window insert includes a first mounting bracket which slips between and resides between the window and it's lower inside weather-stripping. More preferably, the window insert is disposed on the first mounting bracket. Most preferably, the window insert is affixed to the mounting bracket using fasteners.

In another embodiment of the present invention the window insert includes a second mounting bracket. More preferably the second mounting bracket is located opposite the first mounting bracket. Most preferably, the second mounting bracket is affixed to the door window frame with fasteners. It can also be appreciated that more than one second mounting bracket may be utilized.

In another embodiment of the present invention the window insert has a notched edge conforming to the mounting brackets so that the brackets fit into the notch; increasing ease of installation and preventing the insert from shifting in the mounting brackets.

In another embodiment the upper and lower mounting brackets can have different size offsets to allow for different thicknesses of the bulletproof window inserts, allowing various levels of protection. More preferably, the offset also allows for airflow between the window insert and the window, and prevents fogging.

It should also be appreciated that when the window insert is fully installed, the window can be raised or lowered and the automobile can be driven with the insert in place, whether the window is rolled up or down.

Figure 1:
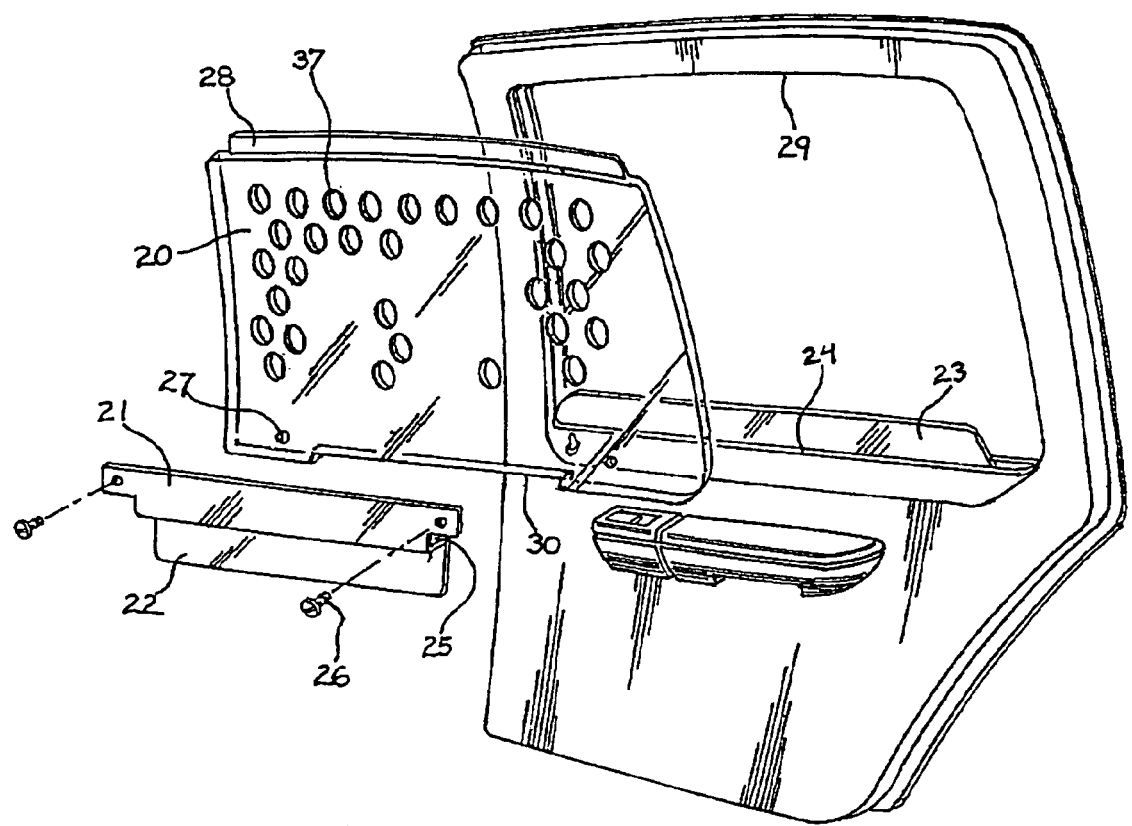
FIG. 1 is a perspective view of the window insert according to an aspect of the present invention.

Turning to FIG. 1, a window insert 20 according to an embodiment of the invention is disclosed. The mounting bracket 21 has a bottom blade 22 sized to be insertable between a standard window 23 of an automobile and the lower inside weatherstripping 24 of the window 23. The mounting bracket 21 has a plane 25 upon which the window insert 20 rests. The mounting bracket 21 also has two fastening devices 26 which retain the window insert 20 having two fastening device receivers 27.

The window insert 20 has an upper protruding edge 28 sized to be insertable, along with the window 20, into the upper receiving channel 29 of the window frame of the automobile door. The insert has a notched bottom 30 to rest upon the mounting bracket plane 25 and two fastening device receivers 27 to retain the window insert 20 in the window frame of the automobile door.

Accordingly, it may be appreciated that to install the window insert 20 of the present invention, the window 23 is retracted, the bottom blade 22 of the mounting bracket 21 is inserted between the window 23 and the lower inside weatherstripping 24. The upper protruding edge 28 of the window insert 20 is inserted into the upper receiving channel 29 of the window frame, and the window insert's notched bottom 30 is rested on the mounting bracket plane 25. The window insert 20 is then retained in place by engaging the mounting bracket fastening device 26 with the window insert fastening device receiver 27. At this point, the window 23 may be raised or lowered as desired. It also may be appreciated that at no place has the window, window frame, or automobile door been modified or attached to.

Figure 2:
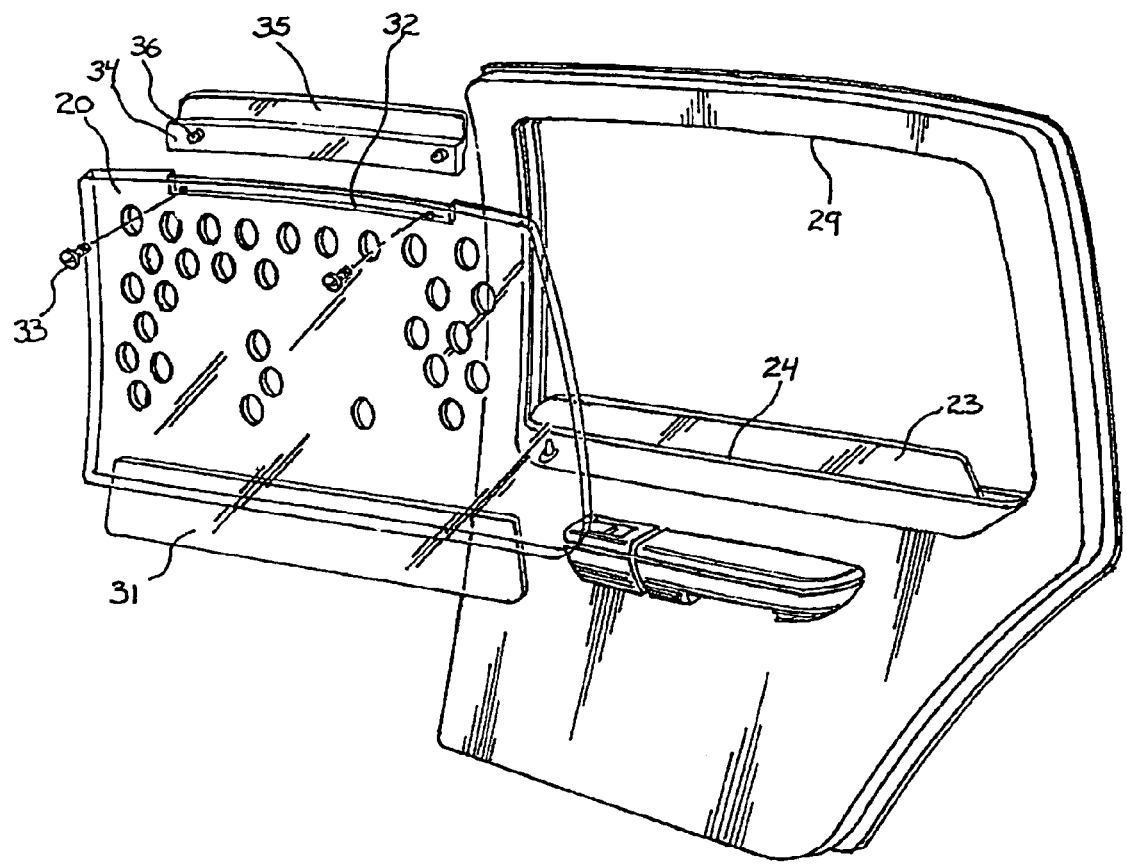
FIG. 2 is a perspective view of another embodiment of the window insert according to an aspect of the present invention.

Similarly, FIG. 2 depicts another embodiment of the window insert 20 according to an aspect of the invention. The window insert 20 has a bottom blade 31 which is sized to be insertable between a standard window 23 of an automobile and the lower inside weatherstripping 24 of the window 23. The top of the window insert 20 has a receiving edge 32 and fastening devices 33. The top mounting bracket 34 has a protruding edge 35 sized to be insertable along with the window 23 into the upper receiving channel 29 of the window frame. The top mounting bracket 34 also has fastening device receivers 36.

Accordingly, it may be appreciated that to install this embodiment of the window insert 20 of the present invention, the window 23 is retracted. The bottom blade 31 of the window insert 20 is inserted between the window 23 and the lower inside weatherstripping 24. The top mounting bracket 34 is inserted into the upper receiving channel 29 of the window frame and is rested on the receiving edge 32 of the window insert 20. The window insert 20 is retained in the window frame by engaging the window insert fastening device 33 and the tip mounting bracket fastening device receivers 36. At this point the window 23 may be raised or lowered as desired and no modification has been made to the car window, window frame, or automobile.

In another aspect of the present invention, it is preferred to include at least one and potentially a plurality of holes or orifices 37, within the window insert 20 so that airflow can be facilitated. In the most basic embodiment of the invention, the orifices 37 may be simply circular openings cut perpendicular to the plane faces of the window insert, as shown in FIG. 1.

Figure 3:
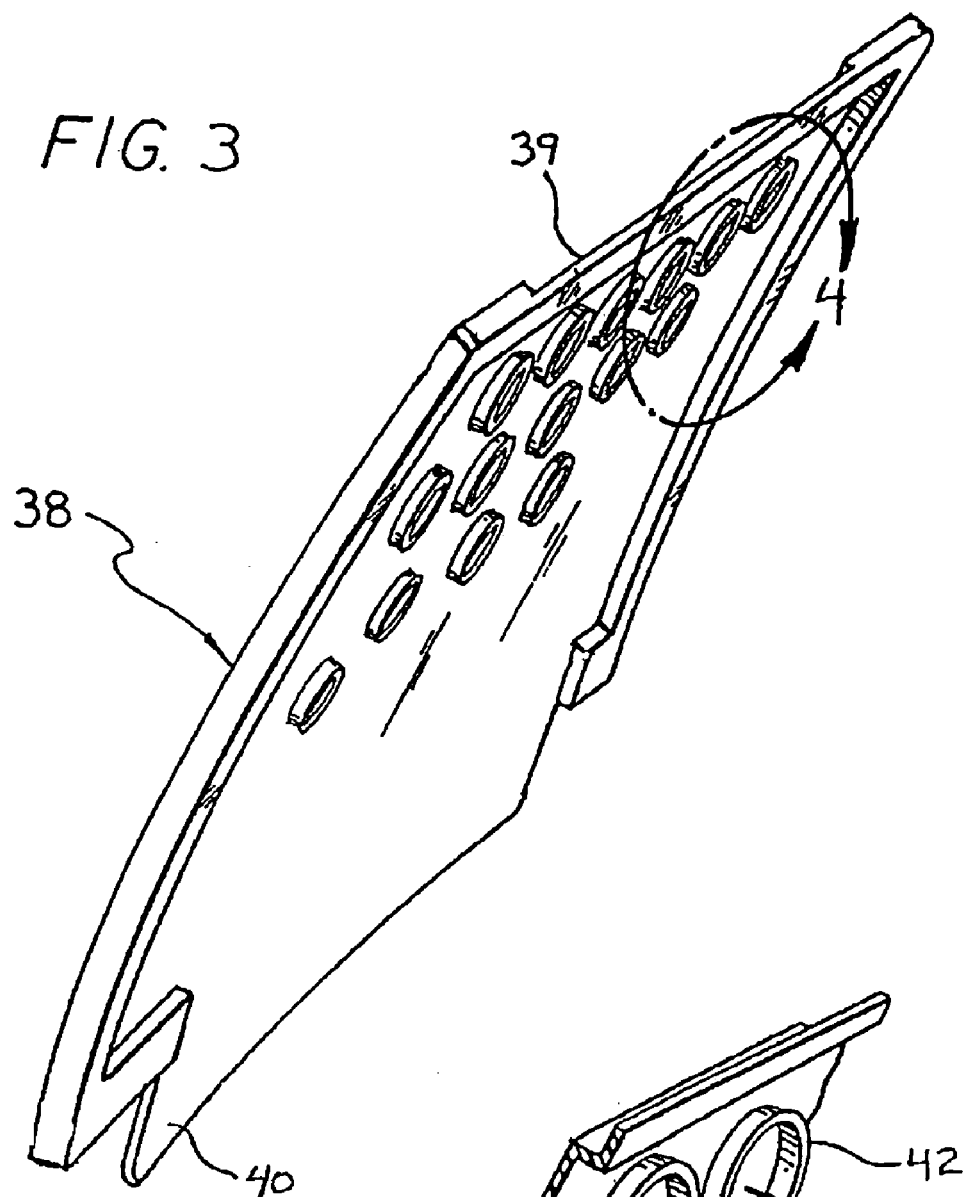
FIG. 3 is a perspective of an alternate embodiment of the window insert.
Figure 4:
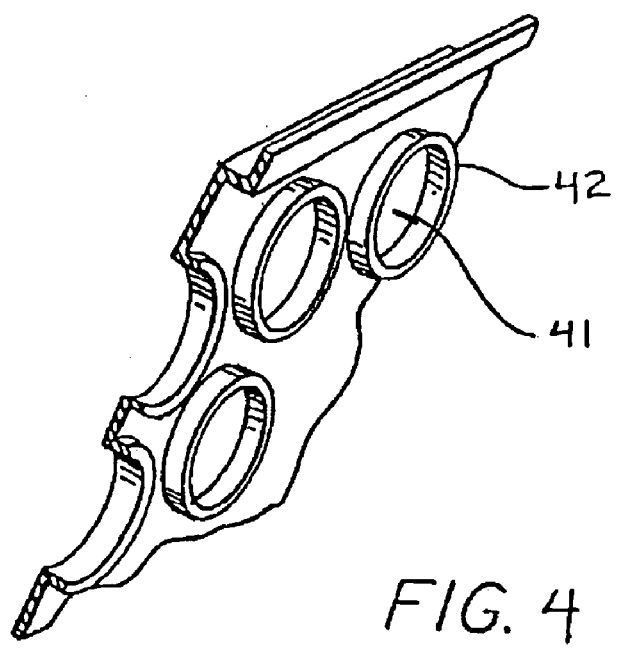
FIG. 4 is an alternative design for the orifices of the window insert.

FIG. 3 is a perspective view of another alternative embodiment for a window insert 38, and FIG. 4 shows an enlarged perspective view identified by circle 4—4 in FIG. 3. In the design according to FIGS. 3 and 4, the window insert 38 is formed to define a stepped pocket 39 to accept the top mounting bracket, and a blade 40 at the lower edge to be insertable between the window and the lower inside weatherstripping. In addition the window insert 38 may include orifices 41 having a circumferential ridge 42, which defines and further strengthens the window insert 38. The design of FIGS. 3 and 4 is particularly well suited to manufacture using a vacuum molding technique.

Figure 5:
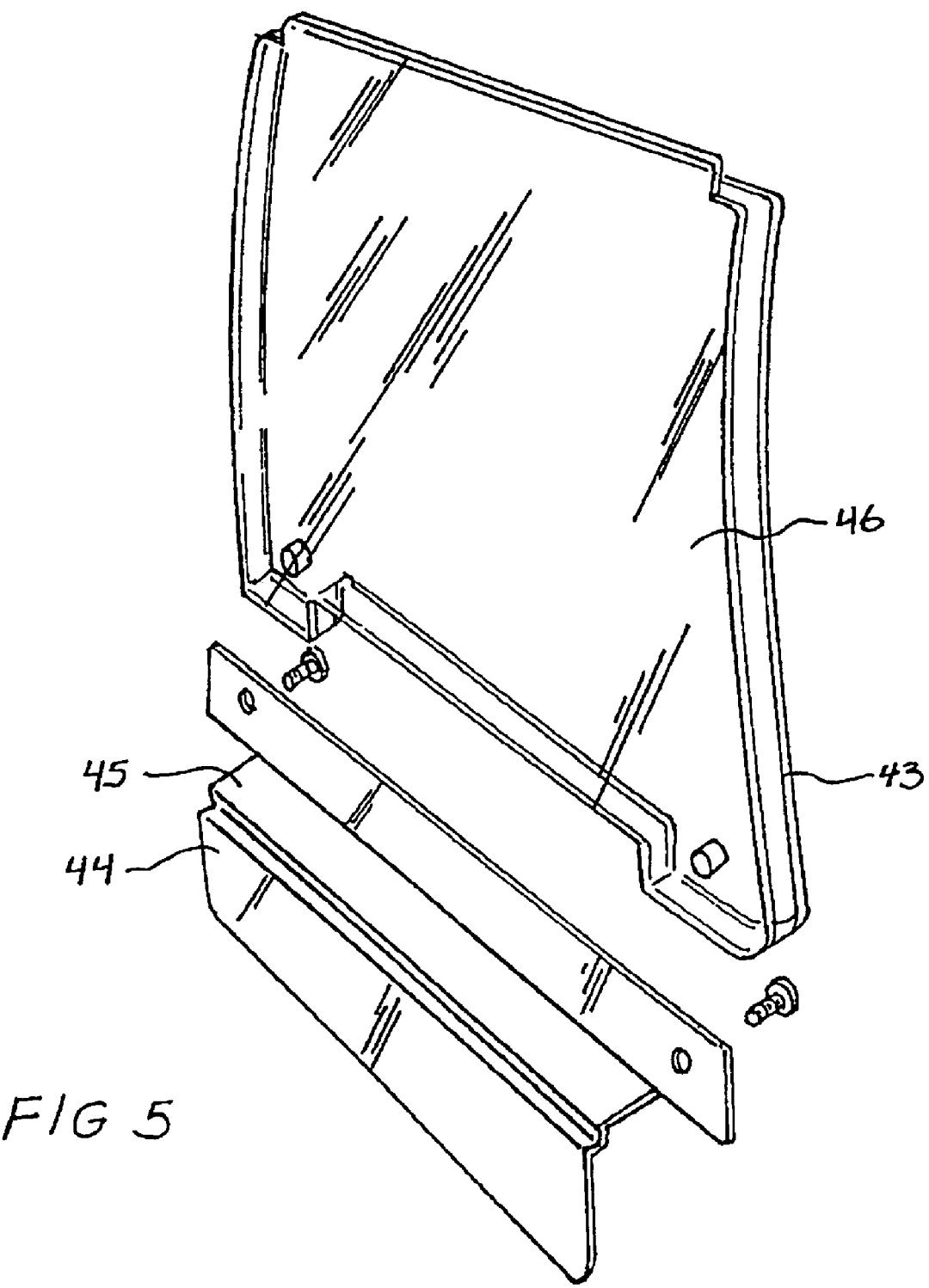
FIG. 5 is a perspective view of the window insert according to an aspect of the present invention.

Moreover, where the window insert is to be used primarily as a high impact resistant bullet proof shield, the window insert would be devoid of orifices as they are illustrated in FIG. 5. For these applications, the window insert may be manufactured of laminated layers 43 from plastics such as polycarbonate or acrylic or plastic laminates, or glass, or glass-plastic composites.

FIG. 5 illustrates the mounting bracket variation for the bullet proof window insert application. The mounting bracket 44 has an offset mounting plane 45 to accept varying thicknesses of the bullet proof window inserts 46, which provide different levels of protection. The offset mounting plane 45 also enhances air flow around the window insert 46, thereby preventing fogging in certain inclement weather conditions. Although not illustrated, it should also be understood that a second mounting bracket may be used to retain the portion of the window opposite the first mounting bracket.

Ergonomically and aesthetically, it is desirable to have a curved window insert 46 which accommodates the natural contour of the curved glass window of most standard vehicles as FIG. 5 illustrates. However, it maybe less expensive to fabricate window inserts from a flat sheet of glass composite or glass-plastic composite.

FIG. 5 also illustrates one method of forming or manufacturing the window inserts of the present invention. As it may be appreciated, window shapes and sizes vary so greatly from automobile to automobile that the window inserts will be manufactured or formed to provide a custom fit in most applications.

Figure 6:
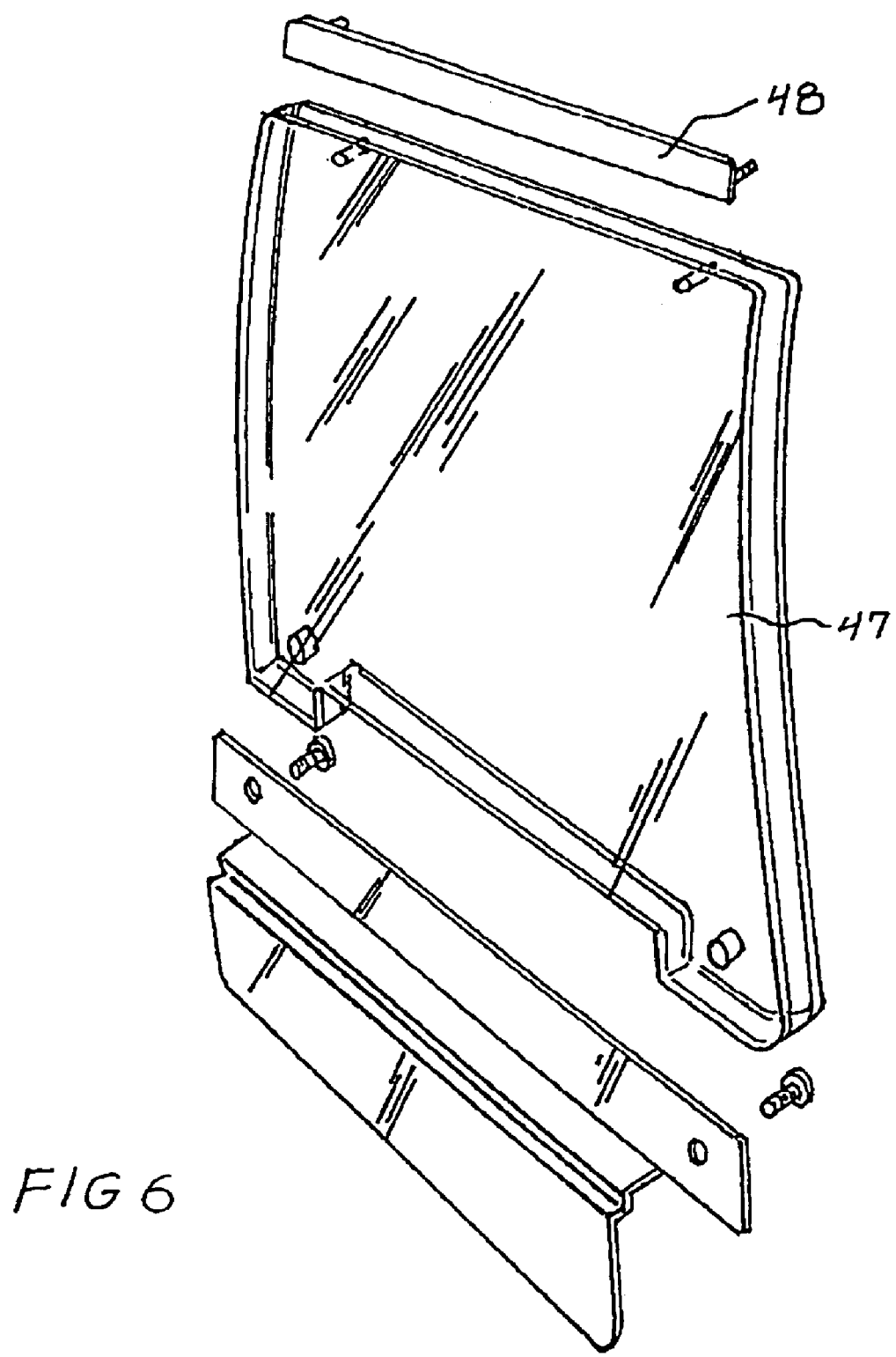
FIG. 6 is a perspective view of an alternative embodiment of the window insert according to an aspect of the present invention.

FIG. 6 illustrates another alternative window insert embodiment where as the protruding edge 48 of the window insert 47 is fabricated from a separate material, such as a plastic or a metal, such as aluminum, or steel, is attached to the window insert in some manner, such as a fastener or adhesive. This may provide added strength to the window insert, provide solutions for an unusual application, or aid in manufacturing.

Figure 7:
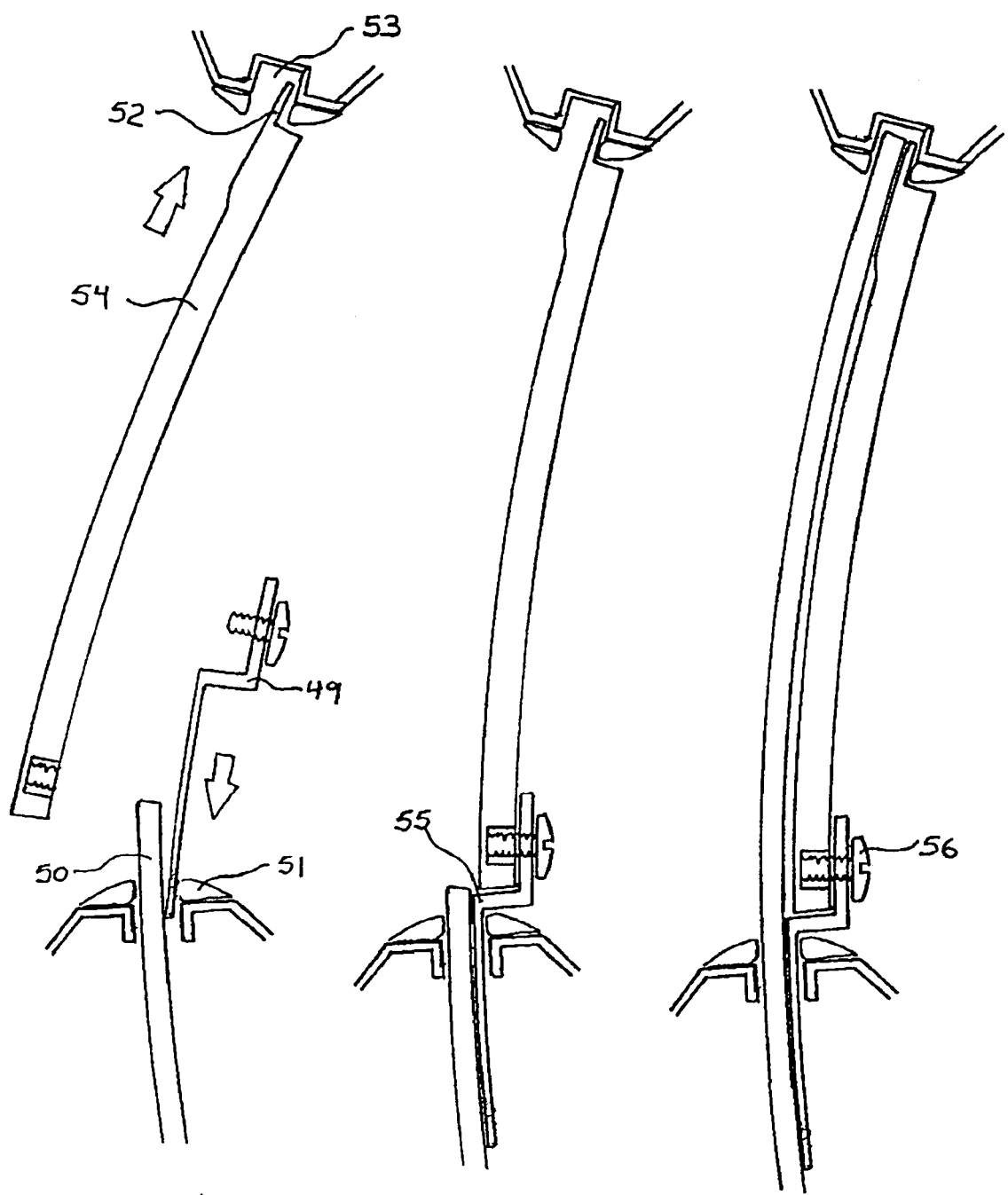
FIG. 7 is a section view illustrating the installation of the window insert.

FIG. 7 illustrates the installation process of one embodiment of the window insert. The mounting bracket blade 49 is inserted between the window 50 and the lower inside weatherstripping 51 of the window 50. The upper protruding edge 52 of the window insert 54 is inserted into the upper window channel 53. The window insert 54 is rested on the mounting bracket plane 55 and then retained in place by the fastening system 56. At this point, the window 50 may be raised and occupy the upper window channel 53 with the upper protruding edge 52 of the window insert 54.

Figure 8:
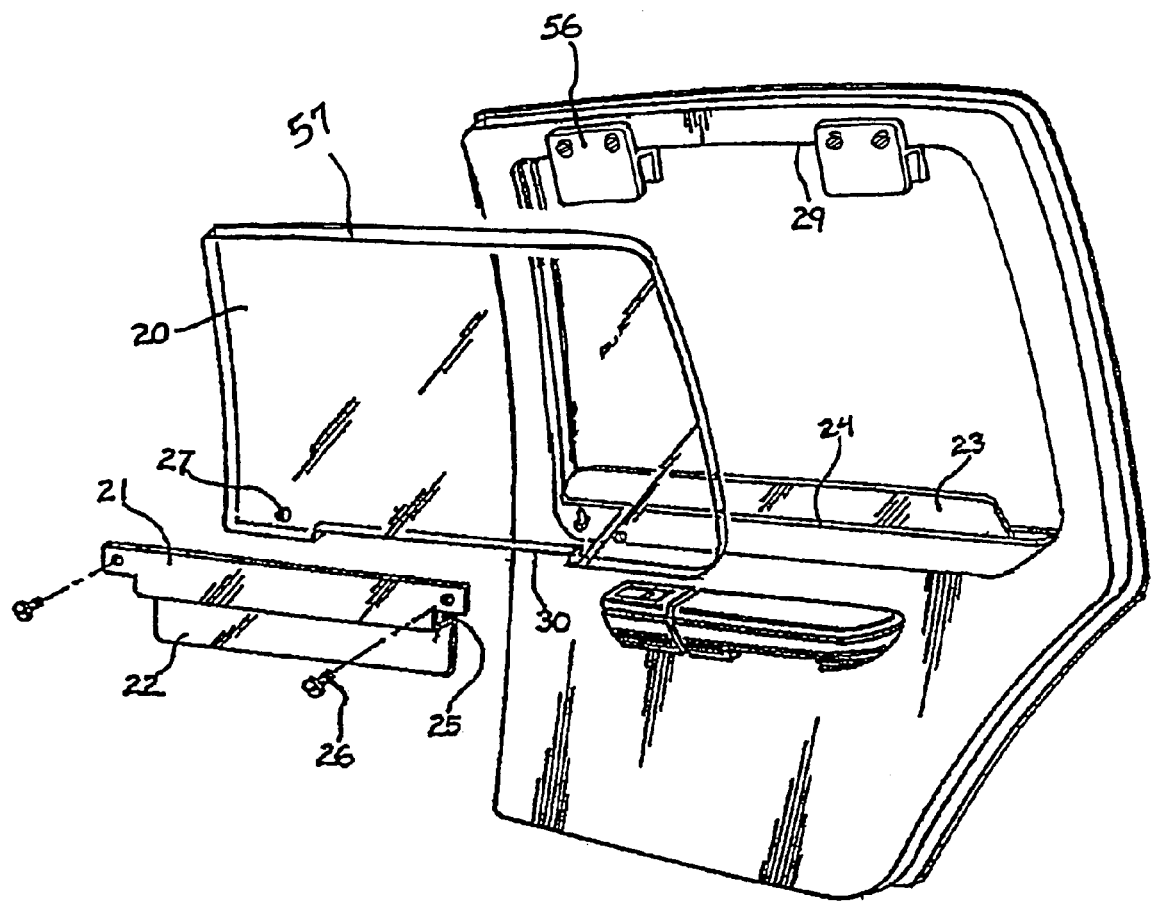
FIG. 8 is a perspective view of another embodiment of the window insert according to an aspect of the present invention.

FIG. 8 illustrates another embodiment of the invention. The window insert 20 is affixed to the door window frame using second mounting brackets 56 at the upper portion of the door window frame 29. Accordingly, it may be appreciated that to install this embodiment of the window insert 20 of the present invention, the window 23 is retracted and the window insert 20 is inserted into the mounting bracket 56. The mounting bracket 22 is inserted between the window 23 and the lower inside weatherstripping 24. The window insert's notched bottom 30 is rested on the mounting bracket plane 25. Fasteners 26 may be used to affix the mounting bracket 22 to the window insert 20 using fastener receivers 27. The opposite portion of the window 57 is retained in the recess of mounting bracket 56 affixed to the window frame. It should be appreciated that more than one second bracket may be used. It should also be appreciated that the second mounting bracket 56 may be attached to the door window frame using fasteners. Furthermore, it should also be appreciated that the window insert 20 may have fastener receivers and be affixed to the second mounting bracket using fasteners.

The foregoing description is provided to illustrate and explain the present invention. However, the description hereinabove should not be considered to limit the scope of the invention set forth in the claims appended here to.

What is claimed is:

1. A safety device for a motor vehicle having a door window defined by a retractable transparent panel which is guided into a receiving frame, the safety apparatus comprising:
   a window insert formed of a sheet of material;
   a window frame including a transparent panel, said window frame having inside and outside surfaces;
   a lower mounting bracket for receiving said sheet, with an edge defined to be releasably inserted in said frame;
   an upper mounting bracket for receiving said sheet, said upper mounting bracket attached to said inside surface of said window frame;
   wherein said window insert defines a notched edge, and wherein said notched edge defines a region in said window insert which is disposed upon said lower mounting bracket.

2. The safety device of claim 1 wherein said sheet comprises an optically transmissive material.

3. The safety device of claim 1 wherein said transparent panel comprises an optically transmissive material.

4. The safety device of claim 2 wherein said optically transmissive material is selected from the group consisting of glass composites, glass plastic composites or plastic.

5. The safety device of claim 2 wherein said optically transmissive material is selected from the group consisting of optically transmissive polycarbonates, acrylics or plastics.

6. The safety device of claim 1 wherein said window insert is formed from a bullet proof material.

7. The safety device of claim 6 wherein said bullet proof material is selected from the group consisting of glass composite, glass/plastic composite, and plastic.

8. The safety device of claim 1 wherein said window insert includes a fastening receiver.

9. The safety device of claim 1 wherein said lower mounting bracket includes a fastening receiver.

10. The safety device of claim 1 wherein said upper mounting bracket includes a fastening receiver.

11. The safety device of claim 1 wherein said upper mounting bracket for receiving said sheet affixes said sheet to said upper mounting bracket.

12. The safety device of claim 1 wherein said upper mounting bracket includes a plurality of upper mounting brackets.

* * * * *